P. H. BATTEN.
METALLIC PACKING.
APPLICATION FILED NOV. 22, 1913.
1,138,178. Patented May 4, 1915.
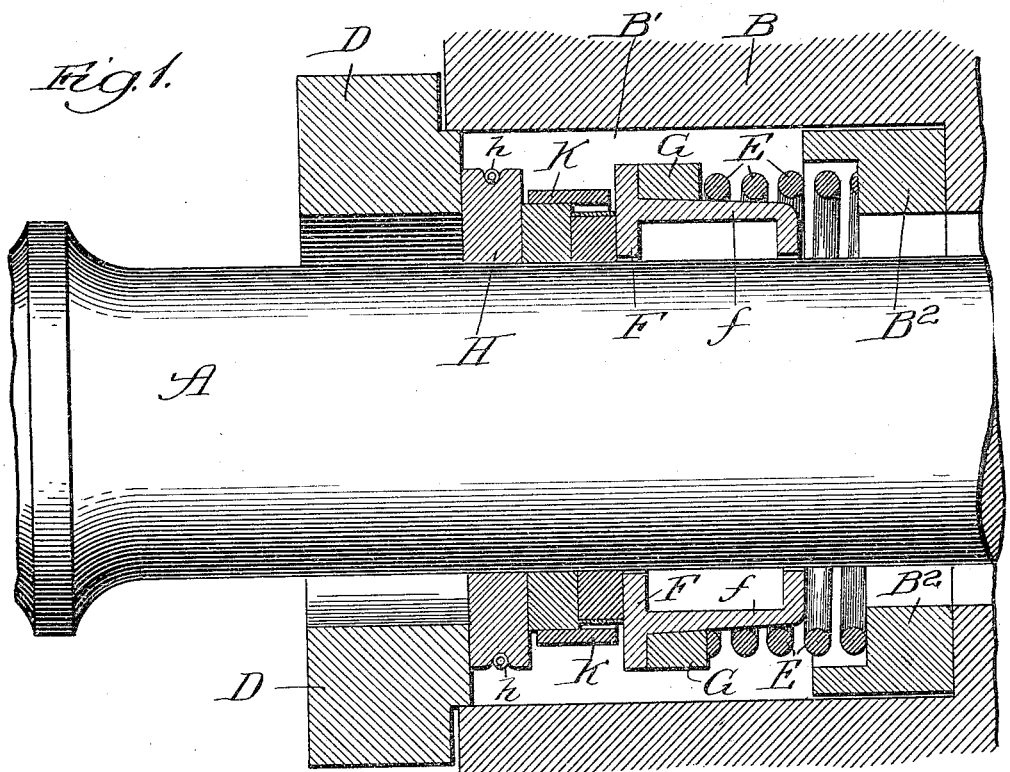
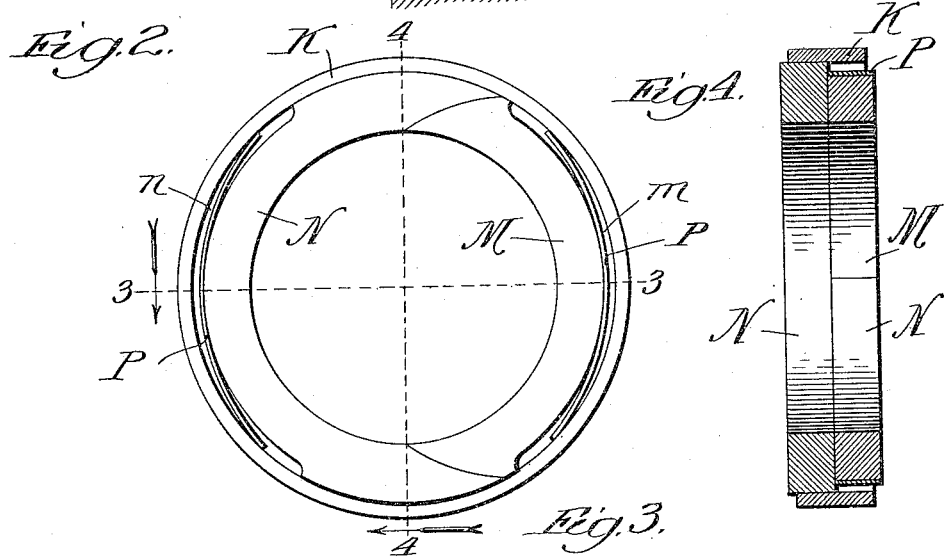
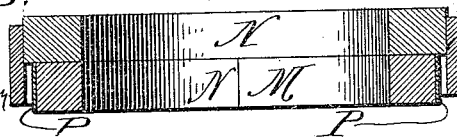
Witnesses: Inventor:
Percy H. Batten
By Peirce, Fisher & Clapp
Attys.

UNITED STATES PATENT OFFICE.

PERCY H. BATTEN, OF CHICAGO, ILLINOIS, ASSIGNOR, BY MESNE ASSIGNMENTS, TO THE HEWITT COMPANY, OF CHICAGO, ILLINOIS, A CORPORATION.

METALLIC PACKING.

1,138,178.   Specification of Letters Patent.   Patented May 4, 1915.

Application filed November 22, 1913. Serial No. 802,536.

*To all whom it may concern:*

Be it known that I, PERCY H. BATTEN, a citizen of the United States, residing at Chicago, in the county of Cook and State of Illinois, have invented certain new and useful Improvements in Metallic Packing, of which I do declare the following to be a full, clear, and exact description, reference being had to the accompanying drawing, forming part of this specification.

My present invention has for its object to provide a simple and effective construction of metallic packing for the rods of steam engines and other machines, and the invention consists in the novel features of construction hereinafter described, illustrated in the accompanying drawing and particularly pointed out in the claim at the end of this specification.

Figure 1 is a view in longitudinal section showing my invention applied to the piston rod of an engine. Fig. 2 is an enlarged detail view of my improved metallic packing ring inclosed within an annular retainer. Fig. 3 is a view in cross section on line 3—3 of Fig. 2. Fig. 4 is a view in cross section on line 4—4 of Fig. 2.

Referring to the accompanying drawing, A designates the piston rod to be packed and B denotes the head of the cylinder through which the piston rod passes. Secured to the outer end of the cylinder head B at a point opposite the chamber B' thereof is the usual gland D that is bolted to the cylinder head in any convenient manner. Within the chamber B' of the cylinder head is placed the coiled spring E, the inner end of which bears against a cup-shaped ring B² and the outer end of which encircles the tubular stem $f$ of the annular chamber follower F that fits over the piston rod A. Preferably, a ring G is interposed between the spring E and the expanded portion of the follower F. As shown, a sectional ring or bushing H encircles the piston rod where it passes through the gland D, the parts of this bushing being held together by a spring $h$. Between the follower F and the ring or bushing H is placed one or more of my improved metallic packing rings. In the drawing, two of these rings are shown inclosed within an annular retainer K.

My improved packing ring comprises a male section M and a female section N. The female section N has each of its ends formed with an inclined face extending from the periphery of the section inwardly toward the center of the section. The male member M of the ring has each of its ends formed with an inclined face extending from the inner surface of the section toward the central part of the periphery of the section; and the end faces of the male and female sections are shaped to snugly fit together when the sections are in position for use. Preferably, the inclined ends of the male and female sections are curved, as in practice this is believed to give the best results. The peripheries of the male and female sections M and N are formed with the long cut-away spaces $m$ and $n$ to receive the plate springs P which, by bearing upon the ring sections and upon the inner face of the retainer K, serve to constantly force the sections against each other and insure their snug bearing against the surface of the rod A, these spaces allowing also for the pressure of steam upon the peripheries of the ring sections to aid in holding them against the rod. As shown, the inner bearing portion of each of the ring sections M and N is of semicylindrical shape, and the inner meeting points of the sections are at diametrically opposite points of the rod A, as this arrangement insures a more uniform bearing of the sections upon the rod as they become reduced by wear. It will be noticed, also, that the peripheral parts of the male section M of my improved packing ring is formed with the bearing portions adjacent the ends, these bearing portions engaging the retainer K and wedging beneath the inclined ends of the female section as the rings are forced together by the springs and by the pressure upon their peripheries.

My improved packing ring is extremely simple and effective in construction and the parts can be readily placed in position for use.

Having thus described my invention, what I claim as new and desire to secure by Letters Patent, is:—

A metallic packing comprising a ring formed of male and female sections, the female section having its peripheral portion extending through an arc of greater angle than its inner bearing portion, and the male section having its peripheral portion extending through an arc of less angle than its inner bearing portion, the meeting ends of the male and female sections being inclined and shaped to fit together, the periphery of the female section being recessed from side to side between its ends to receive a spring and the end portions of the female section having curved peripheral surfaces of the full diameter of the ring, and the male section being recessed from side to side between its ends to receive a spring and having adjacent its inclined ends reduced peripheral portions corresponding to the unreduced end portions of the female section.

PERCY H. BATTEN.

Witnesses:
 WALTER C. WINKAL,
 JOSEPH S. KELLY.

Copies of this patent may be obtained for five cents each, by addressing the "Commissioner of Patents, Washington, D. C."